United States Patent [19]
Bailey, Jr. et al.

[11] Patent Number: 4,701,474
[45] Date of Patent: Oct. 20, 1987

[54] REDUCED REACTIVITY POLYOLS AS FOAM CONTROLLERS IN PRODUCING POLYURETHANES FOAMS

[75] Inventors: Frederick E. Bailey, Jr., Charleston; Benny J. Argento, South Charleston, both of W. Va.

[73] Assignee: Union Carbide Corporation, Danbury, Conn.

[21] Appl. No.: 849,672

[22] Filed: Apr. 9, 1986

[51] Int. Cl.$^4$ ............ C08L 75/00; C08L 71/02; C08L 63/00; C08L 5/06
[52] U.S. Cl. ........................ 521/137; 525/187; 525/404; 525/529; 525/531; 524/377; 524/762; 523/400
[58] Field of Search ........... 521/137; 525/187, 404, 525/529, 531; 524/377, 762; 523/400

[56] References Cited

U.S. PATENT DOCUMENTS

| | | | |
|---|---|---|---|
| 3,385,806 | 5/1968 | Critchfield et al. | 521/117 |
| 3,418,354 | 12/1968 | Wheeler | 521/134 |
| 3,953,393 | 4/1976 | Ramlow et al. | 260/31.8 R |
| 4,146,488 | 3/1979 | Martin | 340/679 |
| 4,524,157 | 6/1985 | Stamberger | 521/156 |
| 4,528,334 | 7/1985 | Knopf et al. | 525/404 |
| 4,574,137 | 3/1986 | Serratelli et al. | 521/137 |

Primary Examiner—John Kight
Assistant Examiner—Dennis R. Daley
Attorney, Agent, or Firm—P. W. Luezzi

[57] ABSTRACT

Reduced reactivity polyols are provided as foam controllers in the production of polyurethane foams. When the foam controllers are incorporated into polyurethane foam formulations, foam rise time is increased without adverse effects on foam characteristics, such as load bearing capability, resiliency and porosity. The foam controllers are acid grafted polyethers, such as acrylic acid grafted poly(alkylene oxides), and can be employed in surprisingly low concentrations to control reactivity.

38 Claims, No Drawings

REDUCED REACTIVITY POLYOLS AS FOAM CONTROLLERS IN PRODUCING POLYURETHANES FOAMS

FIELD OF THE INVENTION

This invention relates in general to a process for preparing stable, flexible, water-blown polyurethane foams. In one aspect. this invention is directed to the use of reduced reactivity polyols as foam controllers in the preparation of polyurethane foams wherein foam rise time is increased without adverse effects on other foam characteristics, such as load bearing capability, resiliency, and porosity. In a further aspect, the invention relates to the use of acid grafted polyether as the foam controller.

DESCRIPTION OF THE PRIOR ART

Flexible polyurethane foams have many commercial uses, such as in packaging, insulation, mattresses, furniture, cushions, carpet underlay, etc. Important properties of these foams are load bearing capability, resiliency, porosity, tensile strength and tear strength. The principal commercial procedure for the production of flexible polyurethane foams is the ("one-shot") technique of reacting and foaming of all starting materials in one step. The starting materials usually include a polyol, a polyisocyanate, water, catalysts, and a silicone surfactant.

In addition to the polyurethane-forming reaction of the polyol with the polyisocyanate in the one-shot process, water reacts with polyisocyanate to form an amine which subsequently reacts with isocyanate to form urea. These reactions yield a urea-urethane polymer which is highly expanded during the foaming reaction by evolved carbon dioxide (formed by the reaction of water with isocyanato groups) and, possibly, by the volatilization of halocarbon compounds (auxiliary blowing agents). The foam which results is termed a water-blown, flexible polyurethane foam.

Commercially, water-blown flexible polyurethane foams are produced by both molded and slab foam processes. Slab foams are generally produced in large buns which, after curing, are sliced or otherwise formed into useful shapes. For example, carpet underlayment is sliced from large buns of polyurethane foam. Molding is utilized to produce directly an object in essentially its final dimensions. Automotive seating and some furniture cushions are examples of employment of the molding process.

Significant commercial volumes of both slab and molded urethane foam are employed for applications such as mattresses, furniture, automobile seating and carpet underlayment. In these latter applications, the load bearing capability of the foam is very important. To yield increased load bearing, fillers are employed in the systems. Highly effective among these fillers are those organic types grafted to polyol. Examples of these organic fillers are those prepared by polymerizing acrylonitrile or copolymerizing acrylonitrile and styrene in polyol and are termed polymer polyols. When a polymer polyol is converted into water-blown, urethane foam, a highly complex chemical and physical structure results. This foam, used in mattresses, furniture, automobile seating, carpet underlayment, is an open-celled foam of ambient air, the solid phase of which is a cross-linked network of polyurea-urethane block polymer, the linkages of which are separated by long, flexible elastomeric chains derived from the base polyol used in the formulation and from which the polymer polyol was made. This complex structure imparts to the water-blown urethane foams the unique characteristics which have led to their wide commercial application. Among these special characteristics are load-bearing capability, resiliency, and porosity.

In the manufacture of urethane foam articles, such as carpet underlayment, it has been found that the rise time, the time from the isocyanate addition to the first observed carbon dioxide blow-off, is very important in obtaining a quality product having the desired properties. In many instances it is desirable to reduce the reactivity of the formulation during foaming in order to achieve a foam product having the desired physical and processing characteristics.

"Delayed action" catalysts are known. It has also been observed that organic acids, such as formic, acetic or 2-ethylhexanoic will reduce the reactivity of urethane foam formulations when employed with the normal ingredients used to produce such polyurethane foams. However, these acids also have additional side effects on the physical characteristics of the water-blown urethane foam produced. For example, although reactivity is reduced, the porosity of the foam can be adversely effected with resulting detrimental effect on load bearing, resiliency and porosity characteristics.

The production of tight flexible urethane foams is disclosed in U.S. Pat. No. 3,385,806. It is indicated in the patent that the invention is based on the discovery that the use of small amounts of oxalic-acid or water soluble salts thereof in an otherwise conventional flexible foam formulation results in a foam having a high proportion of closed cells. Illustrative oxalate salts mentioned include ammonium oxalate, alkali metal oxalate, such as sodium oxalate or potassium oxalate, and the like. Hence, by using an oxalate in a conventional polyurethane foam formulation, the cell structure of the foam is modified to a substantial degree which alters its load-bearing, resiliency and porosity properties.

In U.S. Pat. No. 4,524,157 there are described certain adducts and improved polymer-polyols which are indicated to be useful in the production of polyurethane foams. The patentee states that the novel modified polyols impart significant improvements in load bearing characteristics, tensile strength and stability of cell structure of foams. These adducts or modified polyols are produced by combining polyols and compounds having carboxylic-carbon atoms and/or epoxy groups. It is indicated in the patent, that in one embodiment adducts are produced by reacting a polyol and at least one compound which can be a dicarboxylic acid, an anhydride or a polyepoxide. Accordingly, these adducts are tipped polyols and have very high acid numbers. However, it has been noted that when such adducts are employed in low concentrations in the manufacture of polyurethane foams, they do not significantly affect the rise time of the foam.

OBJECTS OF THE INVENTION

Accordingly, it is an object of this invention to provide a novel process for the preparation of flexible polyurethane foams.

Another object of this invention is to provide a process for preparing flexible polyurethane foams which have controlled rise times without any adverse effects on other foam characteristics.

Still another object of this invention is to provide a process for preparing flexible polyurethane foams which include incorporation into the foam formulation, certain acid grafted polyethers as foam controllers.

Further objects of this invention will become apparent to those skilled in the art from the detailed description thereof presented below.

SUMMARY OF THE INVENTION

This invention relates to a process for producing water-blown, flexible polyurethane foams with controlled rise times and wherein the physical and other properties of the resulting foams are not otherwise adversely effected. The process involves the use of certain acid grafted polyether compounds ("foam controllers") as hereinafter more specifically described.

It will become evident from the detailed description of this invention that although the prior art disclosed in the aforementioned United States patents indicates that acids or acid-tipped polymers have been employed in polyurethane formulations to impart various properties, prior to the present invention there has been no disclosure of the use of acid-grafted polymers such as polyethers, to control reactivity without adversely effecting desirable foam properties. Moreover, it was unexpectedly and surprisingly found that certain alkenoic acid grafted polyethers could be used to achieve the desired results when employed in very low concentrations.

DETAILED DESCRIPTION OF THE INVENTION

In its broad aspect, this invention relates to a process for producing flexible polyurethane foams wherein the foam rise is controlled without adverse effect on the resulting foam properties, which comprises reacting and foaming in one step a reaction mixture comprising: (1) a polyol having an hydroxyl number from about 10 to about 250; (2) an organic polyisocyanate; (3) water; and (4) an acid grafted polyether compound (hereinafter also referred to as a "foam controller").

By incorporating the foam controller of the present invention into the foam reaction mixture, it is possible to increase the foam rise time without adversely effecting the desired physical properties of the resulting foam product. It was also surprisingly and unexpectedly found that the foam controllers could be employed in very low concentrations and yet provide a steady foam rise to give a product of the desired porosity and load-bearing properties.

The foam controllers employed in the present invention are alkenoic acid grafted poly(alkylene oxides), e.g. poly(ethylene oxide/propylene oxide) polymer structure with a number average molecular weight of from about 1000 to about 10,000 and a grafted alkenoic acid content corresponding to an acid number of 3.5 to 120 mg KOH/g. In a preferred embodiment of the present invention, the polymer structures have a number average molecular weight of from about 2500 to about 7000 and still more preferably from about 3000 to about 6000.

The acid-grafted polyether polyols employed in the present invention are prepared by grafting alkenoic acids onto a poly(alkylene oxide) polymer structure by methods known in the art. In example, grafted copolymers can be prepared in accordance with the methods set forth in U.S. Pat. No.3,418,354 which discloses the preparation of olefin-polyoxyalkylene graft copolymers by reacting an olefin, a peroxide compound and a polyoxyalkylene oxide. Another method for the preparation of acrylic or methacrylic graft copolymers of poly(alkylene oxide) is disclosed in U.S. Pat. No. 4,146,488 wherein a free radical initiated polymerization reaction is employed. Azobisisobutyronitrile and t-butyl perbenzoate were employed as free radical initiators.

Carboxylated poly(alkylene oxides) have also been prepared by the method disclosed in U.S. Pat. No. 4,528,334 where acrylic acid has been grafted onto poly(oxyalkylene) compounds such as poly(oxyethylenes), poly(oxypropylenes) and copolymers thereof. The graft copolymers obtained by this patented method are indicated to be substantially free of insoluble homopolymers.

Thus, graft copolymers of alkenoic acids, such as acrylic acid, and a poly(oxyalkylene) of the present invention are prepared by a method which comprises separately adding acrylic acid and a catalytic amount of di-t-butyl perbenzoate, t-butyl peroxide, or t-butyl hydroperoxide to an agitated bath of the poly(oxyalkylene), whereby all of said components are intimately admixed at a temperature of from about 100° C. to about 160° C. and maintaining said temperature until a graft copolymer of acrylic acid on poly(oxyalkylene) is obtained. The catalyst and/or acrylic acid reactants which are to be added to the poly(oxyalkylene) in the reaction zone may be mixed with a portion of the poly(oxyalkylene) prior to feeding to the reaction zone.

The poly(oxyalkylene) compounds used to make the graft copolymers of the invention are known in the art and have the formula

$$R[O\ (EO)_x(PO)_y(BO)_z(H)]_n$$

wherein R is an organic radical containing from 1 to about 12 carbon atoms; EO represents an oxyethylene group, PO represents an oxypropylene group, BO represents an oxybutylene group; x, y and z represent zero or a positive interger, with at least one of x and y being a positive interger, the sum of x, y and z being from about 20 to about 200; and n has a value of from 1 to 6.

The poly(oxyalkylene) compounds of the above formula can be random, or block copolymers or terpolymers and the order of the EO, PO and/or BO moities can be in any sequence.

In general, these compounds contain either oxyethylene or oxypropylene groups or both oxyethylene groups and higher oxyalkylene groups such as oxypropylene and oxybutylene groups, either in random or block distribution in their molecules, and have molecular weights(number average) in the range of about 1000 to about 10,000 and, preferably, in the range of about 2000 to about 7000. These poly(oxyalkylene) compounds may be made by processes well known in the art by reacting an alkylene oxide or mixtures of alkylene oxides with a compound having from one up to as many as six active hydrogen atoms, such as water, monohydroxylic alcohols such as methanol, ethanol, propanol, butanol, and dihydroxylic alcohols such as ethylene glycol and monoethyl ether of glycerine, trihydroxylic alcohols such as glycerine and trimethylolpropane, tetrahydroxylic alcohols such as pentaerythritol, hexahydroxylic alcohols such as sorbitol, alkanolamines such as triethanolamine, and polyamines such as ethylenediamine. The poly(oxyalkylene)products of such reactions will have linear or branched oxyalkylene or oxyethylene-higher oxyalkylene chains, and such chains will terminate with hydroxyl groups.

The alkenoic acids employed in the Preparation of the grafted polyether polyols include those represented by the formula:

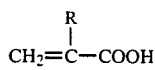

wherein R represents H or lower alkyl. Illustrative of the alkenoic acids are acrylic, methacrylic, 2-ethylacrylic, 2-propyl acrylic, and the like. It should be noted that the acid grafted poly(alkylene oxides) employed as the foam controllers of the present invention differ from the adducts and modified polymer-polyols of the previously mentioned U.S. Pat. No. 4,524,157. Although the adducts and polyols of the patent are prepared from polyols and polycarboxylic acid compounds, the polymeric product obtained is a polyether polyol capped or tipped with acid groups as opposed to polymer having grafted carboxylic groups along the polymeric chains. Hence, polymers with random pendant acid groups, differ from those wherein the polymer is capped with acid groups.

In most instances, the acid-grafted polyether polyol is employed in the foam formulation in a "foam rise controlling amount". By this term, employed in the specification and appended claims, is meant an amount which controls or retards foam rise to achieve optimum processing conditions without adversely effecting physical properties of the foam which properties would otherwise be obtained without the foam controller.

Although it is possible to employ the foam controller directly, in most instances the foam controller is employed as a blend with one or more of the other components of the foam formulation. For example, the foam controller can be blended with a base polyol or polymer polyol in a concentration of from about $1.0 \times 10^{-5}$ to about $1.0 \times 10^{31\ 2}$ milliequivalents of acid per 100 grams of polyol.

If the foam controller is blended with another component of the foam formulation, the concentration employed should be selected such that the concentration in this component will provide to the foam formulation the same overall amount as if it were employed in the base polyol or polymer polyol.

As previously indicated, the acid grafted polyol foam controller is utilized in a wide variety of polyurethane foam formulations.

Accordingly, this invention also relates to polyurethane foams produced by the process of this invention, compositions comprising such foam controllers dissolved, or stably dispersed, in a liquid medium and admixtures comprising foam controllers and at least one other starting material used to make such foams (e.g., a polyol, catalyst or silicone surfactant).

The polyols useful in the present invention are any of the polyols presently employed in the art for the preparation of flexible polyurethane foams.

The polyols employed in the process of this invention can have hydroxyl numbers which vary over a relatively wide range. In general, the hydroxyl numbers of the polyols employed in the invention can range from about 10 to about 250, preferably from about 15 to about 85. The hydroxyl number is defined by the equation:

$$\text{OH No.} = \frac{56.1 \times 1000 \times f}{m.w.}$$

where:
OH No. = hydroxyl number of the polyol;
f = functionality, that is, the number of hydroxyl groups per molecule of polyol;
m.w. = number average molecular weight of the polyol.

Among the Polyols which can be used in the process of this invention are those selected from one or more of the following classes of compositions, alone or in admixture, known to those skilled in the polyurethane art:
(a) alkylene oxide adducts of polyhydroxyalkanes;
(b) alkylene oxide adducts of non-reducing sugars and sugar derivatives;
(c) alkylene oxide adducts of phosphorus and polyphosphorus acids; and
(d) alkylene oxide adducts of polyphenols;

Polyols of types (a) to (d) above are referred to hereinafter as "base polyols".

Illustrative alkylene oxide adducts of mono and polyhydroxyalkanes useful as polyols in the process of this invention include, among others, the alkylene oxide adducts of methanol, butanol, ethylene glycol, propylene glycol, 1,3-dihydroxypropane, 1,4-dihydroxybutane, and 1,6hydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. A preferred class of alkylene oxide adducts of polyhydroxyalkanes are the ethylene oxide and propylene oxide adducts of trihydroxyalkanes.

Preferred polyols useful in the process of this invention include the poly(oxypropylene) glycols, triols, tetrols and hexols. These polyols also include poly(oxypropyleneoxyethylene) polyols. The oxyethylene content should preferably comprise less than 80 weight percent of the total and more preferably less than 40 weight percent. The ethylene oxide, when used, can be incorporated in any fashion along the polymer chain. Stated another way, the ethylene oxide can be incorporated either in internal blocks, as terminal blocks, randomly distributed along the polymer chain, or a combination thereof.

The above-described base polyols can contain small amounts of "inherent" unsaturation (e.g., owing to the isomerization of propylene oxide to allyl alcohol during the manufacture of the polyol). In some cases it may be desirable to include additional unsaturation into the polyols (e.g., when it is desired to produce the polymer polyols).

Another preferred class of polyols useful in the process of this invention are polymer polyols. Polymer polyols are polyols (preferably acrylonitrile-styrene copolymers) containing stably dispersed polymers in a base polyol. The base polyols are described above and are preferably polyols of type (a) above. Suitable polymer polyols are as disclosed in U.S. Reissue Pat. Nos. 28,715 and 29,118 and in U.S. Pat. Nos. 3,823,201; 4,104,236; 4,111,865; 4,119,586; 4,125,505 and 4,208,314; and U.S. patent application Ser. No. 594,633; filed March 29, 1984 now abandoned. The polymer polyols useful in the process of this invention include those sold by Union Carbide Corporation as "NIAX Polyols E-515, E-519, E-585, E-513, 31-28 and E-579"; those sold by Mobay Chemical Corporation as "Multranol E-9151"; those sold by BASF Wyandotte Corporation as "Pluracols 994, 806 and 873"; and those sold by Dow Chemical Corporation as "Voranols XUS-14031.01 and XAS-10946".

Other types of polymer polyols useful in the process of this invention are polyurea/polyols disclosed in U.S. Pat. Nos. 3,325,421; 4,042,537 and 4,089,835 and polyoxamate/polyols disclosed in U.S. Pat. No. 4,407,983.

The polyisocyanates that are useful in the process of this invention are organic compounds that contain at least two isocyanato groups. Such compounds are well known in the art of producing flexible polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanatotoluene, 3,5-diisocyanato-o-xylene, 4,6-diisocyanato-m-xylene, 2,6-diisocyanato-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate (MDI); 3,3'-diphenylmethylene diisocyanate; and polymethylene poly(phenyleneisocyanates) having the formula:

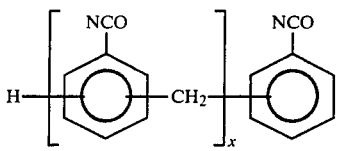

wherein x has an average value from 1.1 to 5 inclusive. The preferred polyisocyanates are a mixture of 80% by weight 2,4-tolylene diisocyanate and 20% by weight 2,6-tolylene diisocyanate (hereinafter "TDI"); a mixture that is about 80% by weight TDI and about 20% by weight of a polymeric poly(methylene polyphenyleneisocyanate) of the formula:

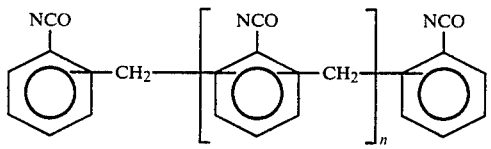

wherein n ranges from about 0 to 2, "Liquid MDI" is obtainable commercially from the Upjohn Company and is disclosed in further detail in U.S. Pat. No. 3,384,653; and all polyisocyanates of the MDI type.

The amount of polyisocyanate included in the foam formulations (reaction mixtures) used in the present invention relative to the amount of other materials in the formulations is generally described in terms of "Isocyanate Index". As used herein, the term "Isocyanate Index" means the actual amount of polyisocyanate used divided by the theoretically required stoichiometric amount of polyisocyanate required to react with all the active hydrogen in the reaction mixture multiplied by one hundred [see Bender, Handbook of Foamed Plastics, Lake Publishing Corp., Libertyville, Ill. (1965)]. Thus, if the Isocyanate Index is 100, then the amount of isocyanato groups in the polyisocyanate is the exact stoichiometric equivalent of the reactive hydrogens in the formulation which will react with isocyanato groups (such reactive hydrogens usually being provided by water, polyol, crosslinker, foam modifier and the medium, if any, in which the foam modifier is dissolved or dispersed). As a further illustration, an Isocyanate Index of 110 indicates a 10 percent stoichiometric excess of isocyanato groups. The Isocyanate Indices in the reaction mixtures used in the process of this invention are between about 90 to about 130 and, preferably, the Isocyanate Indices in the reaction mixtures are between about 95 and about 125.

As indicated above, the amount of foam controller used in the process of this invention will range from about $1.0 \times 10^{-5}$ about $1.0 \times 10^{-2}$ gram milliequivalents of foam controller per 100 grams of the polyol. Preferably, from about $1.0 \times 10^{-5}$ to about $1.0 \times 10^{-3}$ gram milliequivalents of controller per 100 grams of the polyol are used.

The foam controller used in the process of this invention is usually employed dissolved in a liquid medium. The liquid medium utilized is water, a polyol (including the above-described base polyols and polymer polyols), a silicone surfactant or an amine catalyst/water mix.

Water is used as a blowing agent in the process of this invention either alone or with an auxiliary blowing agent such as a halogenated hydrocarbon, (e.g., trichloromonofluoromethane, dichlorodifluoromethane, dichloromonofluoromethane, methylene chloride, trichloromethane, 1,1-dichloro-1-fluoroethane, 1,1,2-trichloro-1,2,2-trifluoroethane, hexafluoro-cyclobutane, octafluorocyclobutane, and the like). The quantity of blowing agent(s) employed will vary with factors such as the density and hardness desired in the foamed product. The amount of water used is generally from 1.5 to 10 parts by weight (preferably from 2.0 to 8 parts by weight) per 100 parts by weight of polyol.

The reaction mixtures (formulations) useful in preparing flexible polyurethane foams in the process of this invention can contain various optional ingredients. For example, the reaction mixtures of this invention usually contain one or more of the amine catalysts, metal catalysts, silicone surfactants and sometimes crosslinkers currently employed in the art of producing water-blown, flexible urethane foams.

Catalysts that can be used in producing the polyurethane foams in accordance with this invention include: tertiary amines, such as bis(N,N-dimethylaminoethyl)ether, trimethylamine, triethylamine, N-methylmorpholine, dimethylaminoethyl morpholine, N,N,N',N'-tetramethylhexanediamine, N-ethyl-morpholine, N,N-dimethylethanolamine, N,N,N'N'-tetramethyl-1, 3-butanediamine, triethanolamine, 1,4-diazabicyclo[2.2.2]octane, pyridine oxide, and the like. Preferred amine catalysts are bis(N,N-dimethylaminoethyl)ether and 1,4-diazabicyclo[2.2.2]octane. Illustrative of the amine catalysts which may be used in the process of this invention are those sold by the Union Carbide Corporation as "NIAX" Catalysts C-229, C-220, and C-183; those sold by Air Products and Chemicals Inc. as "DABCO" 8118, 33LV, and 8154; and those sold by Texaco Chemical Corporation as "THANCAT DD" and "THANCAT TD". The amine catalysts can be used dissolved in solvents (e.g., glycols such as dipropylene glycol) and can be partially neutralized (e.g., with a carboxylic acid such as formic acid).

Metal (e.g., tin, lead and copper) salts or organo-metallic catalysts are usually included in the formulations. Dibutyltin dimaleate, stannous octoate, dibutyltin dilaurate, dibutyltin dilauryl sulfide, and dibutyltin oxide are examples of such metal catalysts which may be used if desired. If used in the process of this invention, amine and/or metal catalysts are employed in small amounts, for example, from about 0.001 parts by weight to about 5 parts by weight of catalyst per 100 parts by weight of the polyol.

The crosslinkers that may be used in the process of this invention include the following compounds:

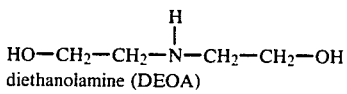
diethanolamine (DEOA)

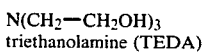
triethanolamine (TEDA)

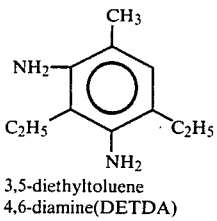
3,5-diethyltoluene
4,6-diamine(DETDA)

1,3-diaminobenzene
(metaphenylenediamine)

These crosslinkers may be used in the reaction mixture in an amount from 0.01 to 20 parts by weight.

The silicone surfactants that may be used in the process of this invention include "hydrolyzable" polysiloxane-polyoxyalkylene block copolymers or "non-hydrolyzable" polysiloxanepolyoxyalkylene block copolymers described in U.S. Pat. Nos. 2,834,748, 2,917,480; 3,505,377; 3,741,417; 3,887,483; 3,980,688; 4,025,452; and 4,071,493. Yet another useful class of silicone surfactants are cyanoalkylpolysiloxanes as described in U.S. Pat. Nos. 3,905,924, 3,952,038 and 4,003,847. Still other useful classes of silicone surfactants are polydimethylsiloxanes containing minor amounts of other silicon-bonded hydrocarbon substituents (e.g., beta-phenylethyl groups) described in U.S. Pat. Nos. 3,839,384 and 3,896,062. As is known in the art, the selection of a particular silicone surfactant for use in a particular foam formulation will depend on such properties as the reactivity of the polyol in the formulation and the like.

The use of silicone surfactants in the process of this invention is important in those cases where fine cell structure is desired and to insure greater foam stability. The silicone surfactants can be used as such or dissolved in solvents such as glycols. The silicone surfactants which are useful in the process of this invention include those sold by Union Carbide Corporation as Y-10366, L-5750, L-5309, L-6202 and Y-10481; those sold by the Dow Corning Corporation as DC-190 and DC-5043 and those sold by Theodore Goldshmidt A.G. as "Tegostab B-4113, and BF-2370". Usually, the reaction mixture for molded foam contains from 0.1 to 5 parts by weight (preferably from 0.5 to 2.5 parts by weight) of a silicone surfactant per 100 parts by weight of the polyols. Usually, the reaction mixture for slab foam contains from 0.3 to 4 parts by weight (preferably from 0.7 to 2.5 parts by weight) of the silicone surfactant per hundred parts by weight of the polyol.

The process of this invention involves mixing, reacting and foaming the above starting materials by the conventional "one-shot" (one step) process. The temperature range useful for the process of this invention to produce polyurethane foams will vary depending on the type of foam to be prepared. Slab foams are made by mixing the starting materials at temperatures in the range of 20° to 40° C. Molded foams are made by heating the molds to temperatures between about 35° C. to 70° C., preferably between about 40° C. to about 65° C., and adding the mixed starting materials to the heated molds. In both cases, the reaction exotherm may cause the foam temperature to rise to up to 165° C. The process conditions and the equipment used to produce conventional slab and molded water-blown flexible polyurethane foam can be used in producing polyurethane foams in accordance with the process of this invention.

The flexible polyurethane foams produced in accordance with the process of the present invention are useful in the same areas as are flexible polyurethane foams produced by prior art processes (e.g., in packaging, insulation, mattresses, furniture, home and automotive cushions, underlay, etc.). The foams of this invention are particularly attractive for use in applications, such as carpet underlayment wherein load-bearing capability, resiliency, and porosity are important.

The following Examples are presented to illustrate the present invention.

The terms and abbreviations used in the Examples have the following meaning:

| Term or Abbreviation | Meaning |
| --- | --- |
| PA | A polyalkylene oxide triol, produced from propylene oxide and ethylene oxide and glycerine with the ethylene oxide as an internal block and having an hydroxyl number of about 52. |
| PB | A polyalkylene oxide triol, produced from propylene oxide and ethylene oxide and glycerine. The product contains about 8 wt. % of an internal ethylene oxide block and has an hydroxyl number of about 58. |
| PC | A polyalkylene oxide triol produced from propylene and ethylene oxides and a glycerine starter having an hydroxyl number of about 28. The ethylene oxide is present primarily in blocks and is used to "cap" the triol. Based on its alkylene oxide content, this triol contains about 83.5 wt. % $C_3H_6O$ and about 16.5 wt. % $C_2H_4O$. |
| PI | A polymer polyol based on polyol PA, containing a stable dispersion of acrylonitrile/styrene copolymer, with an hydroxyl number of about 28. |
| PJ | A polymer polyol sold as "NIAX Polyol E-655" by Union Carbide Corporation having at least 70 mol % primary hydroxyl groups, and an hydroxyl number of about 21. |
| PR | A polyether triol produced from ethylene and propylene oxides sold by the Dow Chemical Company as Voranol 4702. |
| S-2 | A silicone surfactant sold for use in high resiliency foam by Union Carbide Corporation as "Y-10366". |
| S-7 | A silicone surfactant sold for use in high resiliency foam by Union Carbide Corporation as "L-6202". |
| F-1 | A polyalkylene oxide monol produced |

-continued

| Term or Abbreviation | Meaning |
|---|---|
| | from 2-butanol, ethylene oxide and propylene oxide with a number average molecular weight of about 4000. |
| F-2 | A polyether monol which is 10 wt. % of acrylic acid grafted where the monol is F-1. |
| F-3 | A polyether polyol which is 1.2 wt % acrylic acid grafted where the polyol is PC. |
| F-4 | A polyether polyol which is 7.2 wt % acrylic grafted where the polyol is PC. |
| K-1 | A mixture of 70 wt. % bis(dimethylaminoethyl)ether and 30 wt. % dipropylene glycol. |
| K-3 | A mixture of 33 wt. % 1,4-diazabicyclo(2.2.2)-octane and 67 wt. % dipropylene glycol |
| K-4 | Stannous Octoate |
| K-5 | Dibutyltin Dilaurylmercaptide |
| TDI | A mixture of 80 wt. % 2,4-tolylene diisocyanate and 20 wt. % 2,6-tolylene diisocyanate. |
| DEOA | Diethanolamine |
| g | Grams |
| mg | Milligrams |
| in. | Inch |
| % | Percent (by weight unless otherwise indicated) |
| wt. | Weight |
| php | Parts by weight per 100 parts by weight of polyol |
| pcf | Pounds per cubic foot |
| sec. | Seconds |
| lb. | Pounds |
| M | Mols |
| °F. | Degree Fahrenheit |
| °C. | Degree Centigrade |
| CFM | Cubic feet per minute |
| Cu. ft. | Cubic feet |
| ppm | Parts by weight per million parts by weight |
| psi | Pounds per square inch gauge |

GENERAL PROCEDURE

Unless otherwise indicated in the Examples, the polyurethane foams were prepared according the general procedure described in "Urethane Chemistry and Applications", K. N. Edwards, Ed., *American Chemical Society Symposium Series No., 172*, A.C.S., Washington, D.C. (1981) pg. 130 and *J. Cellular Plastics*, November/December 1981, pgs. 333–334 The basic steps in this procedures for mixing and foaming of water-blown polyurethane foam on a laboratory scale are:

1. The formulation ingredients are weighed and made ready to be added in the predetermined sequence to the mixing container.

2. The formulation ingredients are mixed intensively, allowed to "degas" for a prescribed time and an auxiliary blowing agent, other than water, may be added (if such auxiliary agent is used).

3. Polyisocyanate is added and the formulation is mixed again.

Then step 4 and 5 are followed for slab foam or steps 4, 5, 6 and for molded foam.

4. The mixed formulation is poured quickly into either an open-topped container such as an open-topped paper box for slab foam or into a preconditioned mold (previously treated with a mold-release agent) and heated to mold-temperature indicated below. "Cream Time" is the time from the addition of isocyanate to the time a visible movement or expansion of the foam mixture begins. With slab foam "Rise Time" is the time from the addition of the polyisocyanate to the time when there is a noticeable "blow-off" (evolution) of carbon dioxide from the foam surface or the rate of rise has slowed to less than 1/10 inch per minute.

With molded foam, the mold is closed and clamped shut. The molds used are constructed with four vents or ports spaced near the mold edge. "Exit Time" is the time at which an extrusion of foam can be seen coming from these ports or vents.

5. With slab foam after the rise is complete, the foam is placed in an oven at 125° C. for five minutes and then the foam is allowed to stand at ambient temperature for at least 24 hours before being tested.

6. With molded foam the mold is placed in an oven at 125? C. to keep it hot while the foam cures, usually 3 to 8 minutes. "Demold Time" is the time from the time step 3 above is performed to the time the mold is opened and the foam is removed from the mold.

7. Molded foams are crushed to open the cells of the foam and prevent shrinkage. Crushing is done by hand or with mechanical rollers.

TESTONG PROCEDURES

Test methods used to determined the physical characteristics of the foam produced in the Examples were conducted as follows:

| Physical Characteristic | Test Method |
|---|---|
| Density | ASTM D 3574 Test A |
| Elongation | ASTM D 3574 Test E |
| Resilience | ASTM D 3574 Test E |
| IFD | ASTM D 3574 Test B1 and Test B2 |
| Tensile | ASTM D 3574 Test E |
| Tear Resistance | ASTM D 3574 Test F |
| Porosity | ASTM D 3574 Test G |
| Return Value | ASTM D 3574 Test B1 and Test B2 |
| Load Ratio | ASTM D 3574 Test B1 and Test B2 |
| CFD | ASTM 3574 Test C |
| Humid Age, load loss | ASTM D 3574 Test D |
| Humid Age, Compression set | ASTM D 3574 Test D |
| "Hot Load" strength | The foam cure which would be evident in commercial demolding was measured by a "hot cure" measurement. In this measurement, foams were removed from the mold 5 minutes after pouring and a 50% IFD (ASTM D 3574 test B) was measured at 8 minutes. The IFD 50 psi value was taken as "hot-load" strength, a measure of foam "green strength". |
| Extrusion wt. | The foam mold has ports near the four corners of the top of the mold. When the mold fills with foam, some foam extrudes from these ports. These extrusions are broken off and weighed to determine the extrusion weight. |

EXAMPLE 1

Foam Controller in Base Polyol

A. F-2, 10 parts by weight, was blended with 80 parts by weight of polyol PA at 50° C. for one hour with stirring.

B. The above procedure was repeated by blending 10 parts by weight of F-2 with 90 parts by weight of PC.

EXAMPLE 2

Preparation of Polyurethane Foam

The polyols, water, catalyst K-1, surfactant S-7 and, where applicable, the foam controller of example 1 were changed to a one-half gallon paper carton. This mixture was then thoroughly agitated. While mixing, first the catalyst K-4 and then the TDI were added. The reacting mixture was then poured into a 14"×14"×6" cake box. The cream time and the rise time were then noted. The foams were then placed in a 125° C. oven for 5 minutes. After standing 3 days at ambient conditions, 12"×12"×4" test specimens were cut from each foam bun and submitted for standard ASTM analyses.

The amounts of materials employed, the ambient conditions, the cream and rise times and results of the foam analyses are shown in Table I below. Foam number 1 contained no foam controller and was the standard. Foams numbered 2 through 7 contained increasing amounts of the foam controller and clearly show the effect of the controller on foam rise times. Additionally, it is evident from Table I that there was no adverse effect on foam porosity or other physical properties when foam controller is employed.

TABLE I

| | Formulation, php | | | | | | |
|---|---|---|---|---|---|---|---|
| | 1 | 2 | 3 | 4 | 5 | 6 | 7 |
| Polyol PI | 95.00 | 95.00 | 4.75 | 95.00 | 95.00 | 95.00 | 95.00 |
| Polyol PB | 5.00 | 4.875 | 4.75 | 4.625 | 4.50 | 4.25 | 4.00 |
| F-2 | 0.00 | 0.125 | 0.25 | 0.375 | 0.50 | 0.75 | 1.00 |
| Water | 2.30 | 2.30 | 2.30 | 2.30 | 2.30 | 2.30 | 2.30 |
| Catalyst K-1 | 0.03 | 0.03 | 0.03 | 0.03 | 0.03 | 0.03 | 0.03 |
| Surfactant S-7 | 0.70 | 0.7 | 0.7 | 0.7 | 0.7 | 0.7 | 0.7 |
| Catalyst K-4 | 0.11 | 0.11 | 0.11 | 0.11 | 0.11 | 0.11 | 0.11 |
| Toluene diisocyanate (TDI 80/20) | 30.89 | 30.89 | 30.89 | 30.89 | 30.88 | 30.88 | 30.87 |
| Index | 115 | 115 | 115 | 115 | 115 | 115 | 115 |
| Ambient temp., °F. | 72 | 72 | 77 | 72 | 72 | 72 | 72 |
| Relative humidity, % | 42 | 42 | 42 | 42 | 42 | 42 | 42 |
| Polyol temp., °F. | 95 | 95 | 95 | 95 | 95 | 95 | 95 |
| Cream time, sec. | 12 | 12 | 13 | 13 | 13 | 13 | 13 |
| Rise time, sec. | 129 | 135 | 138 | 140 | 147 | 151 | 155 |
| Density, pcf | 2.36 | 2.38 | 2.39 | 2.39 | 2.40 | 2.41 | 2.40 |
| Porosity, cfm/sq. ft. | 40.1 | 40.1 | 45.5 | 45.5 | 48.2 | 48.2 | 48.2 |
| IFD, 4 in., lbs/50 sq. in. | | | | | | | |
| 25%, deflection | 128.2 | 133.5 | 135.2 | 133.0 | 134.0 | 134.5 | 133.8 |
| 65%, deflection | 233.0 | 239.2 | 240.5 | 237.8 | 241.8 | 242.5 | 241.2 |
| 25%, return | 78.5 | 79.5 | 79.5 | 78.5 | 79.0 | 78.5 | 78.2 |
| return value | 61.2 | 59.6 | 58.8 | 59.0 | 59.0 | 58.4 | 58.5 |
| load ratio | 1.82 | 1.79 | 1.78 | 1.79 | 1.80 | 1.80 | 1.80 |
| Tensile, psi | 27.2 | 28.9 | 26.7 | 24.6 | 25.3 | 26.8 | 28.1 |
| Elongation, % | 66.7 | 73.9 | 66.7 | 60.9 | 62.4 | 68.2 | 69.6 |
| Tear, lb/in. | 1.90 | 1.98 | 1.98 | 1.93 | 1.88 | 2.18 | 1.93 |
| Compression set, 90% | 7.1 | 7.7 | 8.0 | 8.0 | 8.0 | 7.6 | 7.0 |

TABLE II

| | Formulation, php | |
|---|---|---|
| | 1 | 2 |
| Polyol PB | 100 | 100 |
| F-2 | 0.00 | 0.50 |
| Water | 2.30 | 2.30 |
| Catalyst K-1 | 0.03 | 0.03 |
| Surfactant S-7 | 0.70 | 0.7 |
| Catalyst K-4 | 0.11 | 0.11 |
| Isocyanate TDI 80/20 | 35.95 | 35.92 |
| Index | 115 | 115 |
| Ambient temp., °F. | 72 | 72 |
| Relative humidity, % | 42 | 42 |
| Polyol temp., °F. | 95 | 95 |
| Cream time, sec. | 14 | 15 |
| Rise time, sec. | 167 | 185 |
| Density, pcf | 2.37 | 2.36 |
| Porosity, cfm/sq. ft. | 71 | 84 |
| IFD, 4 in., lbs/50 sq. in | | |
| 25% deflection | 46.8 | 44.2 |
| 65% deflection | 81.8 | 78.2 |
| 25% return | 36.0 | 34.2 |
| return value | 77.0 | 77.4 |
| load ratio | 1.75 | 1.77 |
| Tensile, psi | 11.5 | 13.1 |
| Elongation, % | 105.9 | 133.4 |
| Tear, lb/in. | 1.32 | 1.34 |
| Compression set, 90% | 1.94 | 1.93 |

EXAMPLE 3

Preparation of Polyurethane Foam

Where as the foams prepared in Example 2 employ polymer polyol, the foams prepared in this example employ base polyol. The procedures used are identical to those in Example 2.

The amounts of materials used the ambient conditions, the cream and rise times and the results of foam analyses are shown in Table II below. Foam number 1 contained no foam controller and the standard. Foam Number 2 contained the foam controller and clearly showed the effect on rise time. Additionally, it is evident from Table II that there was no adverse effect on foam porosity or other physical properties when the foam controller is employed.

EXAMPLE 4

Preparation of Acid Ester Tipped Polyol from Polyol PC

A. Polyol PC (11,606 g) was charged to a four-necked, 22-liter reaction vessel and heated in a heating mantle with stirring under nitrogen to 41° C. At this point 169.4 grams of succinic anhydride were added to the reaction vessel with continued heating and stirring. At 50° C., a catalytic amount of KOH (2.69 grams) was added with continued heating and stirring. The temperature was allowed to reach 148° C. and then held at 148° C. for one and one-half hours to produce a succinic anhydride half-acid of polyol PC. The reaction vessel and contents were then allowed to cool under nitrogen. A sample of the half-acid so produced was taken and the acid number was determined using a Mettler Memotitrator. The theoretical acid number for the half-acid based on charge to the reactor was 8.06 mg KOH/gram of sample. The acid number was determined to be 7.959 mg KOH/gram of sample confirming the formation of the acid ester.

EXAMPLE 5

Preparation of Polyurethane Foams in the Presence of Mono and Difunctional Acids or an Acid-Ester The procedure described in Example 2 was repeated to prepare several series of foams. These foam preparations showed the effects of 2-ethylhexanoic acid, oxalic acid and the acid-ester, prepared in Example 4, on foam rise times and porosities.

The amounts of materials used, the ambient conditions, the cream and rise times and the results of foam analyses are shown in Table III and Table IV below.

In Table III, foams numbered 1 and 2 contain no acids and are standards. Foams numbered 3 and 4 contain the acid-ester and clearly showed the high concentration of acid required and the detrimental effect on porosity. Foams numbered 5 and 6 contained 2-ethylhexanoic acid and clearly showed the detrimental effect on porosity.

In Table IV, foams numbered 1 and 4 contained no oxalic acid and are standards. Foams numbered 2, 3, 5, and 6 contained varying amounts of oxalic acid. There is clearly little effect on foam rise times and a detrimental effect on foam porosities.

TABLE III

| | Formulation, php | | | | | |
|---|---|---|---|---|---|---|
| | 1 | 2 | 3 | 4 | 5 | 6 |
| Polyol PI | 100 | 100 | 94 | 94 | 100 | 100 |
| Acid/Ester (Example 4) | 0 | 0 | 6 | 6 | 0 | 0 |
| 2EtHxAcid | 0 | 0 | 0 | 0 | .144 | .144 |
| Water | 2.30 | 2.30 | 2.30 | 2.30 | 2.30 | 2.30 |
| Catalyst K-1 | 0.05 | 0.03 | 0.05 | 0.03 | 0.05 | 0.03 |
| Silicone S-7 | 0.9 | 0.9 | 0.9 | 0.9 | 0.9 | 0.9 |
| Catalyst K-4 | 0.12 | 0.10 | 0.12 | 0.10 | 0.12 | 0.10 |
| Isocyanate TDI | 29.29 | 29.29 | 29.20 | 29.20 | 29.29 | 29.29 |
| Index | 110 | 110 | 110 | 110 | 110 | 110 |
| Ambient temp., F. | 73 | 73 | 73 | 73 | 73 | 73 |
| Relative humidity, % | 44 | 44 | 44 | 44 | 44 | 44 |
| Polyol temp., F. | 85 | 95 | 85 | 95 | 85 | 95 |
| Cream time, sec. | 10 | 10 | 13 | 12 | 11 | 11 |
| Rise time, sec. | 114 | 130 | 128 | 142 | 121 | 132 |
| Density, pcf | 2.43 | 2.46 | 2.42 | 2.50 | 2.34 | 2.44 |
| Porosity, cfm/sq. ft. | 32 | 35 | 5 | 12 | 0.5 | 1.4 |
| IFD, 4 in., lbs/50 sq. in. | | | | | | |
| 25% deflection | 134.2 | 133.2 | 125.2 | 132.0 | 132.5 | 141.0 |
| 65% deflection | 240.5 | 240.2 | 226.8 | 240.0 | 238.2 | 254.2 |
| 25% return | 76.0 | 75.8 | 74.2 | 78.5 | 77.5 | 81.5 |
| return value | 56.6 | 56.8 | 59.3 | 59.5 | 58.5 | 57.8 |
| load ratio | 1.79 | 1.80 | 1.81 | 1.82 | 1.80 | 1.80 |
| Tensile, psi | 28.2 | 29.3 | 27.9 | 28.7 | 29.0 | 31.8 |
| Elongation, % | 66.7 | 72.5 | 84.1 | 79.7 | 81.1 | 82.6 |
| Tear, lb/in. | 2.39 | 2.50 | 2.71 | 2.57 | 2.57 | 2.75 |
| Compression set, 90% | 8.0 | 7.6 | 8.3 | 7.7 | 12.8 | 9.2 |

TABLE IV

| | Formulation, phr | | | | | |
|---|---|---|---|---|---|---|
| | 1 | 2 | 3 | 4 | 5 | 6 |
| Polyol PI | 100 | 100 | 100 | 100 | 100 | 100 |
| Oxalic acid, ppm | 0 | 3 | 6 | 0 | 3 | 6 |
| Water | 2.30 | 2.30 | 2.30 | 2.30 | 2.30 | 2.30 |
| Catalyst K-1 | 0.05 | 0.05 | 0.05 | 0.05 | 0.05 | 0.05 |
| Silicone S-7 | 0.9 | 0.9 | 0.9 | 0.9 | 0.9 | 0.9 |
| Catalyst K-4 | 0.09 | 0.09 | 0.09 | 0.10 | 0.10 | 0.10 |
| Isocyanate TDI | 29.73 | 29.73 | 29.73 | 29.73 | 29.73 | 29.73 |
| Index | 110 | 110 | 110 | 110 | 110 | 110 |
| Ambient temp., F. | 71 | 71 | 71 | 71 | 71 | 71 |
| Relative humidity, % | 57 | 57 | 57 | 57 | 57 | 57 |
| Polyol temp., F. | 85 | 85 | 85 | 85 | 85 | 85 |
| Cream time, sec. | 10 | 10 | 10 | 10 | 10 | 10 |
| Rise time, sec. | 146 | 150 | 145 | 138 | 139 | 139 |
| Density, pcf | 2.38 | 2.42 | 2.41 | 2.37 | 2.36 | 2.38 |
| Porosity, cfm/sq. ft. | 48 | 32 | 13 | 35 | 29 | 10 |
| IFD, 4 in., lbs/50 sq. in. | | | | | | |
| 25% deflection | 108.5 | 124.5 | 121.2 | 111.0 | 109.5 | 116.2 |
| 65% deflection | 204.2 | 233.2 | 225.5 | 207.0 | 207.2 | 219.0 |
| 25% return | 66.0 | 73.2 | 73.0 | 66.5 | 65.5 | 71.0 |
| return value | 60.8 | 58.8 | 60.2 | 59.9 | 59.8 | 61.1 |
| load ratio | 1.88 | 1.87 | 1.86 | 1.86 | 1.89 | 1.88 |
| Tensile, psi | 21.5 | 24.8 | 23.8 | 25.1 | 25.0 | 25.7 |
| Elongation, % | 57.5 | 70.4 | 64.6 | 70.4 | 71.8 | 69.0 |
| Tear, lb/in. | 1.87 | 1.90 | 1.66 | 1.84 | 2.01 | 1.67 |

TABLE IV-continued

| | Formulation, phr | | | | | |
|---|---|---|---|---|---|---|
| | 1 | 2 | 3 | 4 | 5 | 6 |
| Compression set, 90% | 7.6 | 8.0 | 7.0 | 7.8 | 7.6 | 7.8 |

EXAMPLE 6

Preparation of Polyurethane Foam

Whereas the foams prepared in Example 2 employed F-2, the foams prepared in this example employed F-2, F-3 and F-4. The procedures used are identical to those in Example 2.

The amounts of materials used, the ambient conditions, the cream and rise times and the results of foam analyses are shown in Table V below. Foam number 4 contained no foam controller and was employed as the standard. Foam numbers 1–3 contained the foam controller F-2. Foam numbers 5–7 contained foam controller F-3. Foam numbers 8–10 contained foam controller F-4. The data presented in Table V clearly demonstrates the effect of the foam controllers on rise times and that there was no adverse effect on foam porosity or other physical properties.

TABLE V

| | Formulation, php | | | | | | | | | |
|---|---|---|---|---|---|---|---|---|---|---|
| | 1 | 2 | 3 | 4 | 5 | 6 | 7 | 8 | 9 | 10 |
| Polynol PI | 95 | 95 | 95 | 95 | 95 | 95 | 95 | 95 | 95 | 95 |
| Polyol PB | 5 | 5 | 5 | 5 | 5 | 5 | 5 | 5 | 5 | 5 |
| F-2 | 0.05 | 0.075 | 0.10 | 0 | | | | | | |
| F-3 | | | | 0 | 0.387 | 0.581 | 0.774 | | | |
| F-4 | | | | 0 | | | | 0.067 | 0.100 | 0.134 |
| Water | 2.30 | 2.30 | 2.30 | 2.30 | 2.30 | 2.30 | 2.30 | 2.30 | 2.30 | 2.30 |
| Catalyst K-1 | 0.03 | 0.03 | 0.03 | 0.03 | 0.03 | 0.03 | 0.03 | 0.03 | 0.03 | 0.03 |
| Silicone S-7 | 0.07 | 0.7 | 0.7 | 0.7 | 0.7 | 0.7 | 0.7 | 0.7 | 0.7 | 0.7 |
| Catalyst K-4 | 0.11 | 0.11 | 0.11 | 0.11 | 0.11 | 0.11 | 0.11 | 0.11 | 0.11 | 0.11 |
| Isocyanate TDI | 30.89 | 30.89 | 30.89 | 30.89 | 30.88 | 30.88 | 30.87 | 30.89 | 30.89 | 30.89 |
| Index | 115 | 115 | 115 | 115 | 115 | 115 | 115 | 115 | 115 | 115 |
| Ambient temp., °F. | 70 | 70 | 70 | 70 | 70 | 70 | 70 | 70 | 70 | 70 |
| Relative humidity, % | 41 | 41 | 41 | 41 | 41 | 41 | 41 | 41 | 41 | 41 |
| Polyol temp., °F. | 95 | 95 | 95 | 95 | 95 | 95 | 95 | 95 | 95 | 95 |
| Cream time, sec. | 12 | 13 | 13 | 12 | 12 | 13 | 13 | 13 | 13 | 13 |
| Rise time, sec. | 141 | 148 | 154 | 124 | 137 | 148 | 149 | 138 | 144 | 153 |
| Density, pcf | | | | | | | | | | |
| Porosity, cfm/sq. ft. | 52 | 53 | 49 | 40 | 45 | 55 | 42 | 45 | 52.5 | 53.1 |

EXAMPLE 7

Use of Foam Controller F-2, to Control the Exit Time in A Molded Urethane Foam In a molded foam, the formulation ingredients are intensively mixed and poured into an aluminum mold which is then closed and clamped shut. The top of the mold has four ports located at the top near the corners of the mold. The ports are about ⅛" in diameter. Exit time is the time foam extrudes from these ports indicating that the mold is full of risen foam. Exit-time corresponds in describing a molded foam with rise-time in describing a free-rise or slab foam. In this example, five formulations are used for comparison. With increasing concentration of F-2, exit-time is increased. In these examples, effectively "hot-load" does not change while with increasing F-2, exit time is controllably increased.

| Molded Foam Formulation, php | |
|---|---|
| Polyol PR | 65 |
| Polyol PJ | 35 |
| Water | 4.15 |
| DEOA | 1.5 |
| Catalyst K-1 | 0.13 |
| Catalyst K-3 | 0.40 |
| Catalyst K-5 | 0.007 |
| Surfactant S-2 | 1.4 |
| TDI (105 Index) | |
| Foam Controller - Example 1B | variable |
| [Mold is preheated to 140° F.] | |

| Amount of F-2, php | "Hot Load" | Exit Time |
|---|---|---|
| 0 | 21 psi | 32 sec. |
| 0.5 | 20 | 34 |
| 1.0 | 19 | 35 |
| 2.0 | 20 | 36 |
| 4.0 | 20 | 39 |

What is claimed is:

1. A process for producing flexible polyurethane foams wherein the foam rise is controlled without adverse effect on the resulting foam properties, said process comprising reacting and foaming in one step a reaction mixture comprising: (1) a polyol having a hydroxyl number from about 10 to about 250, (2) an organic polyisocyanate: (3) water; and (4) a foam rise controlling amount of an alkenoic acid grafted poly(alkylene oxide) polymer with a number average molecular weight of from about 1000 to about 10,000.

2. A process as claimed in claim 1 wherein the alkenoic acid used in preparing the grafted poly(alkylene oxide) polymer has the formula:

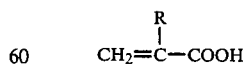

wherein R represents hydrogen or lower alkyl.

3. A process as claimed in claim 2 wherein the alkenoic acid is acrylic acid.

4. A process as claimed in claim 2 wherein the alkenoic acid is methacrylic acid.

5. A process as claimed in claim 2 wherein the alkenoic acid is 2-ethylacrylic.

6. A process as claimed in claim 2 wherein the alkenoic acid is 2-propyl-acrylic.

7. A process as claimed in claim 1 wherein the poly(alkylene oxide) polymer has the formula:

$$R[O(EO)_x(PO)_y(BO)_z(H)]_n$$

wherein R is an organic radical containing from 1 to 12 carbon atoms: EO represents an oxyethylene group, PO represents an oxypropylene group, BO represents an oxybutylene groupl x, y and z represent zero or a positive integer, with at least one of x and y being a positive integer, the sum of x, y and z being from about 30 to about 200, and n has a value of from 1 to 6.

8. A process as claimed in claim 7 wherein said poly(alkylene oxide) polymer is a polyethylene oxide.

9. A process as claimed in claim 7 wherein said poly(alkylene oxide) polymer is a copolymer of ethylene oxide and propylene oxide.

10. A process as claimed in claim 7 wherein said poly(alkylene oxide) polymer is a polypropylene oxide.

11. A process as claimed in claim 8 wherein said polymer is a block copolymer

12. A process as claimed in claim 8 wherein said polymer is a random copolymer.

13. A process as claimed in claim 7 wherein said poly(alkylene oxide) polymer is a terpolymer of ethylene oxide propylene oxide and butylene oxide.

14. A process as claimed in claim 13 wherein said terpolymer is a block terpolymer.

15. A process as claimed in claim 13 wherein said terpolymer is a random terpolymer.

16. A process as claimed in claim 1 wherein said alkenoic acid grafted (alkylene oxide) polymer is contained in a diluent.

17. A process as claimed in claim 15 wherein said diluent is one of the liquid components of said reaction mixture.

18. A process as claimed in claim 1 wherein there are no more than 12 parts water per 100 parts by weight of polyol in the reaction mixture.

19. A process as claimed in claim 1 wherein the polyl is polymer polyol.

20. A process as claimed in claim 1 wherein the polyol is polymer polyol in which the polymer is present in an amount from 1 to 65 weight percent based on the weight of the polymer polyol.

21. A process as claimed in claim 1 wherein the polyol is a polyalkylene oxide triol.

22. A process as claimed in claim 1 wherein the polyol is a polyalkylene oxide tetrol.

23. A process as claimed in claim 1 wherein the polyol is a polyalkylene oxide hexol.

24. A process as claimed in claim 1 where the polyisocyanate is a mixture of tolylene diisocyanates.

25. A process as claimed in claim 1 wherein the polyisocyanate is a polymeric polymethylene poly(phenylene isocyanate).

26. A process as claimed in claim 1 wherein the polyisocyanate is 4,4-diphenylmethylene diisocyanate.

27. A process as claimed in claim 1 wherein the polyisocyanate is a mixture of 4,4'-diphenylmethylene diisocyanate and a polymethylene poly(phenylene isocyanate).

28. A process as claimed in claim 1 wherein the reaction mixture contains a catalytic amount of an amine catalyst.

29. A process as claimed in claim 1 wherein the reaction mixture contains a catalytic amount of an amine catalyst selected from a group consisting of bis(N,N-dimethylaminoethyl)ether, trimethylamine, triethylamine, N-methylmorpholine, dimethylaminoethyl morpholine, N,N,N',N-tetramethylhexanediamine, N-ethylmorpholine, N,N-dimethylethanolamine, N,N,N'N'-tetramethyl-1, 3-butanediamine, triethanolamine, 1,4-diazabicyclo(2.2.2)octane, pyridine oxide.

30. A process as claimed in claim 1 wherein the reaction mixture contains a catalytic amount of bis(N,N-dimethylaminoethyl)ether or 1,4-diazabicyclo (2.2.2) octane.

31. A process as claimed in claim 1 wherein the reaction mixture contains a catalytic amount of a tin, lead or copper salt or a tin, lead or copper organo-metallic compound.

32. A process as claimed in claim 1 wherein the reaction material contains an auxiliary blowing agent.

33. A process as claimed in claim 32 wherein the auxiliary blowing agent is a member selected from the group consisting of trichloromonofluoromethane, dichlorodifluoromethane, dichloromonofluoromethane, methylene chloride, trichloromethane, 1,1-dichloro-1-fluoroethane, 1,1,2-trichloro - 1,2,2-triflouroethane, hexafluro-cyclobutane and octafluorocyclobutane.

34. A polyurethane foam produiced by the process of claim 1.

35. A polyurethane foam as claimed in claim 34 which is a foam suitable for carpet underlayment.

36. A composition useful for the production of polyurethane foams comprised of: (1) a polyol having a hydroxyl number from about 10 to about 250, (2) an organic polyisocyanate: (3) water; and (4) an alkenoic acid grafted poly(alkylene oxide) polymer with a number average molecular weight of from about 1000 to about 10,000.

37. The composition of claim 36 wherein the alkenoic acid grafted poly(alkylene oxide) polymer is contained in a diluent.

38. The composition of claim 37 wherein the diluent is a liquid and is one of the components employed in said composition.

* * * * *